United States Patent [19]

Boardman

[11] 3,831,839
[45] Aug. 27, 1974

[54] RACING CALCULATOR
[76] Inventor: Albert Boardman, 140 Chaldon Way, Coulsdon, England
[22] Filed: Dec. 9, 1971
[21] Appl. No.: 206,471

[52] U.S. Cl............... 235/88, 235/78, 235/61 G
[51] Int. Cl........................ G06c 3/00, G06c 27/00
[58] Field of Search ............. 235/61 G, 88, 84, 78

[56] References Cited
UNITED STATES PATENTS

| | | | |
|---|---|---|---|
| 1,338,588 | 4/1920 | Prescott | 235/84 |
| 2,185,202 | 1/1940 | Kuhlman | 235/61 G |
| 2,342,674 | 2/1944 | Kotcher | 235/84 |
| 2,489,030 | 11/1949 | Herrick | 235/84 |
| 2,725,194 | 11/1955 | Krauss | 235/84 |
| 3,635,397 | 1/1972 | Kurland | 235/78 |

Primary Examiner—Stephen J. Tomsky
Attorney, Agent, or Firm—Snyder, Brown and Ramik

[57] ABSTRACT

A device suitable for use in comparing the form ratings of runners in a race, comprising two elements relatively rotatable about an axis, each element having a scale bearing surface, the surface of the first element bearing circular time and rating scales disposed concentrically about said axis and the surface of the second element having a circular distance scale also concentric with said first surface scales, the scales being disposed radially adjacent to one another so that they can be read simultaneously.

9 Claims, 2 Drawing Figures

PATENTED AUG 27 1974  3,831,839

RACING CALCULATOR

BACKGROUND OF THE INVENTION

Field of the Invention

The invention relates to a racing calculator, or, more particularly to a calculator for use in comparing the form ratings for animals, e.g. horses, in a race.

SUMMARY

According to the invention there is provided a device suitable for use in comparing the form ratings of horses in a race, comprises two elements relatively rotatable about an axis, each element having a scale bearing surface, the surface of the first element bearing circular time and rating scales disposed concentrically about said axis and the surface of the second element having a circular distance scale also concentric with said first surface scales.

In a first preferred embodiment, the elements are in the form of discs rotatably interconnected about said axis.

In another preferred embodiment, one element is formed of a transparent rigid material having the scale or scales superposed thereon, this element overlying the scale bearing surface of the other element.

A cursor rotatable about said axis and substantially parallel to the plane of the scales may be provided to facilitate reading the scales.

BRIEF DESCRIPTION OF THE DRAWINGS

In order that the invention may be more fully understood an embodiment in accordance therewith will now be described by way of example with reference to the accompanying drawings in which.

DESCRIPTION OF THE PREFERRED EMBODIMENT

Figure 1:
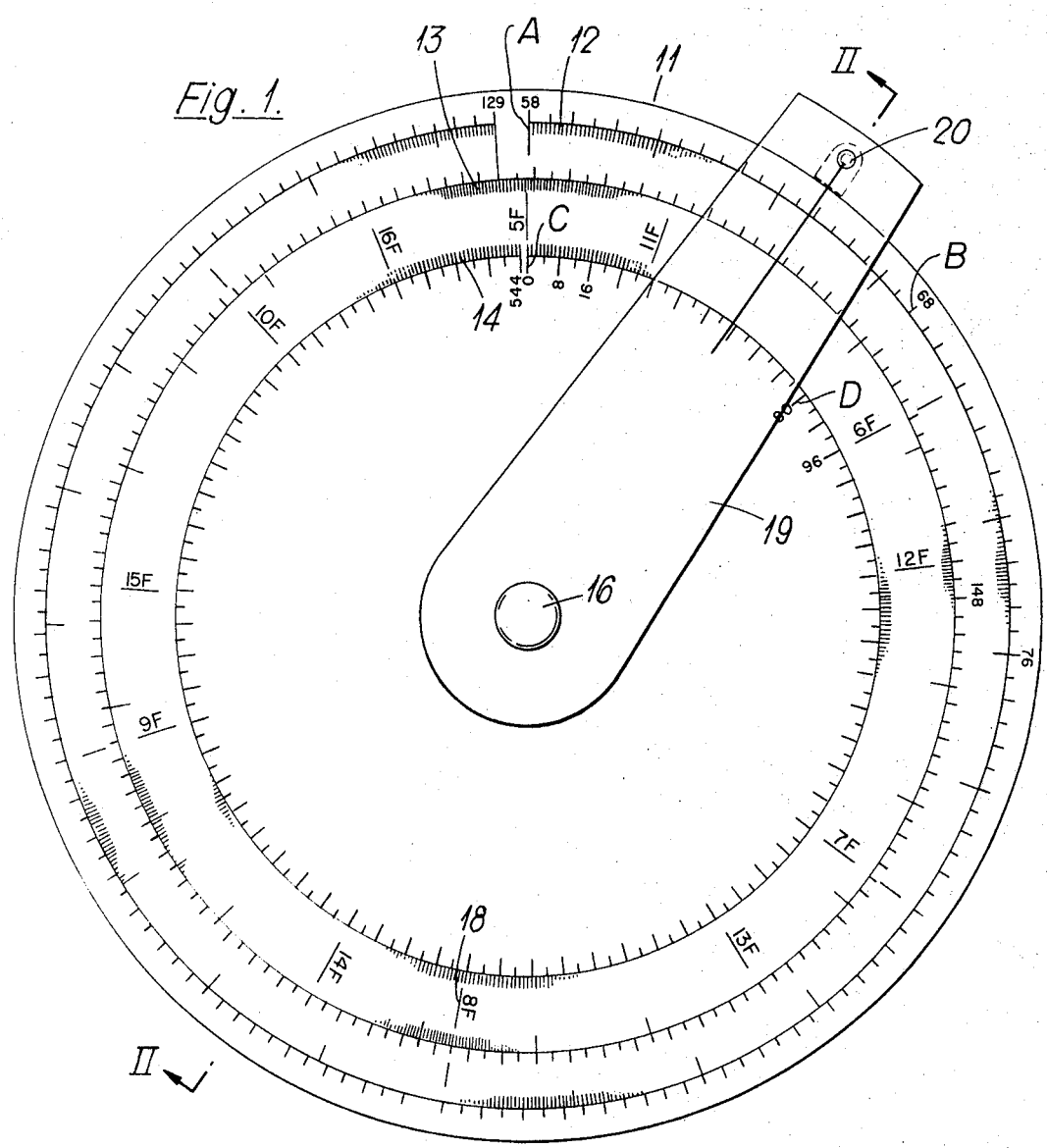
FIG. 1 is a plan of a racing calculator.
Figure 2:
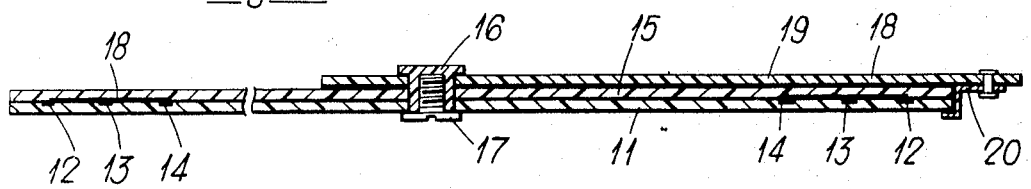
FIG. 2 is a vertical section through the calculator along the line II — II in FIG. 1.

Referring to the drawings these show a racing calculator which comprises a first element in the form of a flat opaque disc 11, e.g., of white or coloured synthetic plastics material, upon which are inscribed two concentric time scales 12 and 13, the inner time scale 13 being a continuation of the outer scale 12, and the graduations on the scale being decreasingly spaced with increasing time to allow for the decreasing time factor over longer distances. The disc 11 also bears a circular rating scale 14, concentric with the time scales.

At the centre 15 of the disc 11, which is also the centre or axis of the scales 12, 13 and 14, is rotatably mounted a second element in the form of a transparent disc 15 by a pin 16 passing through the centre of both discs and internally threaded to receive a securing screw 17. The disc 15 is substantially of the same diameter as the disc 11 and overlies the surface bearing the scales 12, 13 and 14. On the side of the transparent disc adjacent the scales 12, 13 and 14 is a circular distance scale 18, concentric with the other scales. The distance scale is so positioned as to be capable of being read simultaneously with the time scale or with both time and rating scales. The distance scale markings may be of a different colour from the colour of the other scales and all the scales may be of different colours.

To aid accuracy in reading the scales on the two discs a cursor 19 is preferably provided and comprising a synthetic plastics material strip having a transparent portion on which is marked a radial line; the cursor is rotatably mounted on the pin 16, the outer end portion of the strip being slidably engaged against the periphery of one or both discs by a resilient arm 20. In addition to the cursor line, the strip also has graduations on either side of the line, corresponding to graduations of the rating or other scale or all of them and disposed so as to be read simultaneously therewith.

In the drawings, the time scale commences at a time of 58 seconds, is graduated in seconds as indicated at A and corresponds to a decreasing number of graduations in the rating scale with increasing time. Thus 10 seconds on the rating scale corresponds initially to approximately 80 rating scale units as indicated between the points A and B corresponding to the 80 rating scale units between points C and D, from 76 to 148 seconds on the time scale, each 10 seconds corresponds to an interval of approximately 74 rating units, and thereafter to approximately 69 units. The distance scale is in this case in furlongs, one furlong corresponding to 96 rating units. The distance scale could of course be in other units such as metres.

In operation, the rating of the horse is calculated with reference to its performance in a previous race of similar or identical distance. The transparent disc 15 bearing the distance scale, is rotated until the distance over which the previous race was run is set against the time taken by the horse in question to run that distance. The corresponding rating for the distance to be run in the race under consideration is read directly on the scale 14 and corresponds to the time in question.

The rating is adjusted for weight, age and distance allowances. The weight allowance is calculated by finding the difference between the weight carried in the previous race and that to be carried in the race under consideration, the allowance being positive if unfavourable to the horse and negative if favourable. From this allowance is subtracted the difference between the heaviest weight to be carried in the race and that to be carried by the horse under consideration, the weight allowance being converted into rating units at the rate of one quarter of a rating unit per pound.

The age allowance takes account of the different ages of horses in a race, according to the following table:

| Horses | Length of Race Furlongs | Allowance Rating Units |
|---|---|---|
| 2 years old v. 3 years old | all | 4 |
| 3 years old v. 4 years old | 5 to 8 8 to 12 12 to 16 | 2 3 4 |
| 4 years old v. 5 years old | 8 to 12 12 to 16 | 2 3 |

The allowance is subtracted from the rating if favourable to the horse under consideration.

The distance allowance is added to the rating and corresponds to the distance, if any, by which the horse was beaten in the race from which form ratings were taken. One rating unit is added to the rating per length by which the horse was beaten.

Instruction regarding the allowance to be made may be inscribed on the opaque disc 11, suitably within the scales.

The graduations on the cursor may be used to make the addition or subtraction dictated by the allowance calculations.

I claim:

1. A device for use in comparing the form ratings of animals in a race, said device comprising a first element having a first scale-bearing surface and capable of rotation, about an axis, relative to a second element having a second scale bearing surface, the first scale-bearing surface bearing a circular time scale and a circular linear rating scale, disposed concentrically about said axis, and the second scale-bearing surface bearing a circular distance scale concentric with said time and rating scales, the distance scale being such that a distance of one furlong on the distance scale corresponds substantially to 96 units, or a multiple thereof, on the rating scale, and the time scale being such that the ratio of the number of rating units corresponding to a 10 second interval on the time scale between time scale readings of 58 seconds and 76 seconds, between time scale readings of 76 seconds and 148 seconds and above a time scale reading of 148 seconds is 80:74:69.

2. A device according to claim 1 wherein said elements are in the form of discs and are rotatably interconnected about said axis.

3. A device according to claim 1 wherein one of said elements is formed of transparent rigid material having each scale thereof superposed thereon, this element overlying the scale bearing surface of the other element.

4. A device according to claim 1 wherein a cursor is rotatably mounted with said elements about said axis and is substantially parallel to said scale bearing surfaces of said elements.

5. A device according to claim 1 wherein a pivot device is provided and said elements are mounted on said pivot device for relative rotation between said elements, said pivot device forming said axis.

6. A slide rule type device for determining a form rating of an animal in a race for comparison with form ratings similarly determined for other animals in such race, comprising in combination:

first and second elements interconnected for relative motion therebetween;

said first element having a surface provided with a pair of scales, one of said scales being a linear rating scale and divided into equal units each representing an animal rating unit and running consecutively from one end of the scale to the other end thereof, and the other of said scales being a time scale having three consecutive linear sections each of different modulus; and said second element having a surface provided with a distance scale registrable simultaneously with said pair of scales, said distance scale being linear and divided into equal units each representing a particular distance such as a furlong.

7. A slide rule type device as defined in claim 6 wherein the modulus of said rating scale is such that the units thereof corresponds to lengths, if any, by which the animal was beaten in a previous race.

8. A slide rule type device as defined in claim 7 wherein the modulus of said rating scale is such that the units thereof correspond to 4 pounds per rating unit based upon the difference between the weight carried in a previous race and that to be carried in the race under consideration and to age of the animal.

9. A slide rule type device as defined in claim 8 wherein the modulus of said distance scale is such that a distance of one furlong thereon corresponds substantially to 96 units on the rating scale, and the modulus of said three sections of the time scale are such that 10 seconds on such first section corresponds to the 80 rating scale units and extends from a time of 58 seconds to a time of 76 seconds, the second section extends from 76 to 148 seconds on the time scale and corresponds to 74 rating units per 10 seconds, and the third section extends from 148 seconds on the time scale and corresponds to 69 rating units per 10 seconds.

* * * * *